United States Patent [19]

Peyre

[11] Patent Number: 4,740,132
[45] Date of Patent: Apr. 26, 1988

[54] DEVICE FOR HANDLING CONTAINERS

[76] Inventor: Xavier Peyre, Chemin de Ruvere, Chatelaudren, France, 22170

[21] Appl. No.: 854,320

[22] Filed: Apr. 21, 1986

[30] Foreign Application Priority Data

Apr. 24, 1985 [FR] France ................... 85 06299

[51] Int. Cl.$^4$ ................................................. B60P 1/06
[52] U.S. Cl. ................................. 414/494; 280/43.23; 414/500; 414/538
[58] Field of Search ............... 414/471, 473, 480, 482, 414/485, 500, 538, 571, 483, 484, 494; 280/43.23, 43.24

[56] References Cited

U.S. PATENT DOCUMENTS

| 1,451,127 | 4/1923 | Thornton | 414/494 X |
| 1,537,457 | 5/1925 | Bryan | 414/494 |
| 2,745,566 | 5/1956 | Bouffard | 414/500 X |
| 2,763,389 | 9/1956 | Heidenrich | 280/43.24 X |
| 4,065,825 | 1/1978 | Cohen | 414/480 X |
| 4,626,166 | 12/1986 | Jolly | 414/469 X |

FOREIGN PATENT DOCUMENTS 2252231  6/1975  France .

Primary Examiner—L. J. Paperner
Assistant Examiner—Stuart J. Millman
Attorney, Agent, or Firm—Darby & Darby

[57] ABSTRACT

This invention relates to a light towable vehicle (1) designed for maneuvering a detachable container (22), such as a skip. This vehicle comprises a support frame (4) and a platform (7) hinged together. It is provided with two wheels (5) on an axle (6) and with a coupling member (3) for being hitched to a towing vehicle (2); it carries a slender mast (8), the lower end (10) of which is pivotally linked to the front end of said frame (4). The mast top carries a pulley (12) for a cable (20) attached by one end to the front end (11) of the platform and by its other end to a winch (21) on the platform (7) for raising the front end (11) of the platform.

The frame (4) carries two pivots (14) forming an axis (15) for the pivoting of the platform. This axis (15) is preferbaly near the vertical plane of the center of gravity of the platform. The distance from this axis to the rear end (16) of the platform which is to be lowered to the ground is longer than the distance from this axis (15) to the ground, so that the rear end (16) of the platform will cooperate for the raising of the platform and the tipping of the container (22) by resting on the ground.

9 Claims, 2 Drawing Sheets

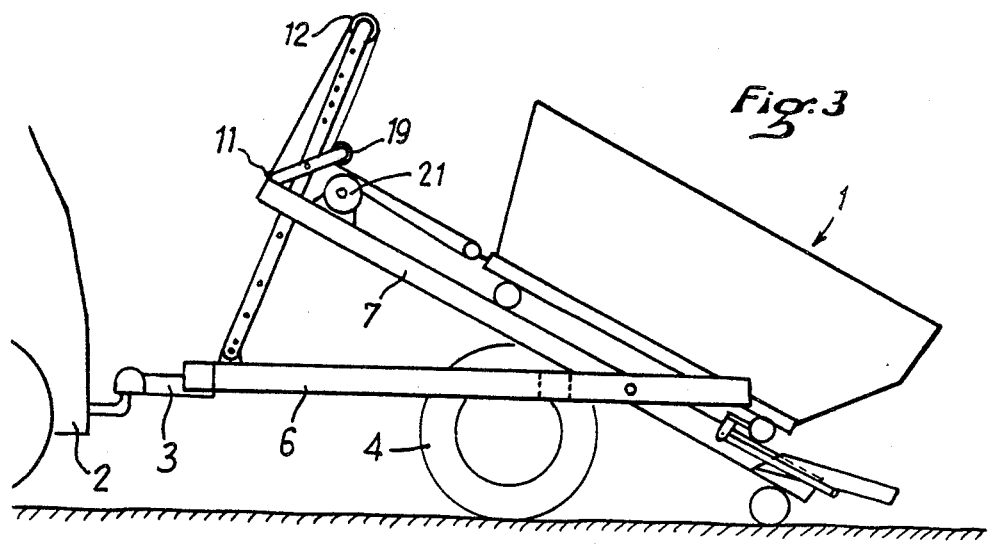
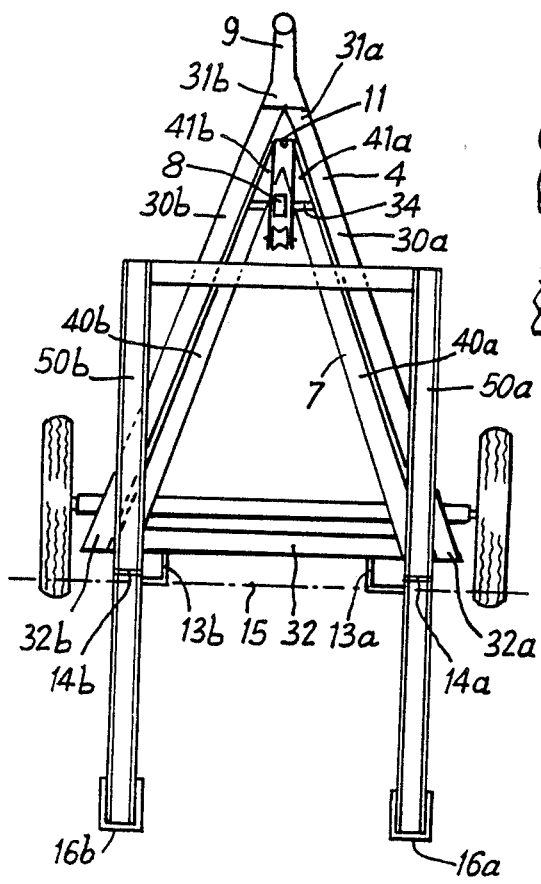
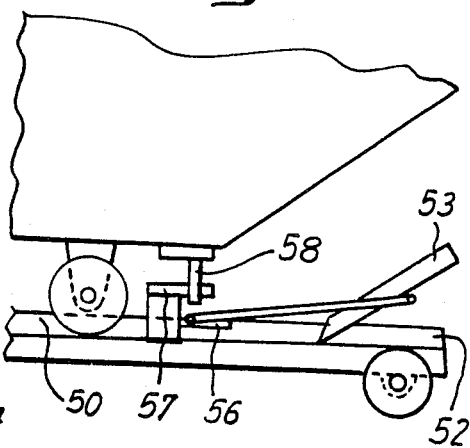

… …

DEVICE FOR HANDLING CONTAINERS

This invention relates to a device for handling detachable containers, which can be more particularly adapted to light vehicles for allowing a container to be hoisted, towed and unloaded.

In many instances, it is inconvenient to transport heavy loads by vehicles. This is because sometimes vehicles are prevented from coming close to sides of loading and unloading.

The main purpose of this invention is to provide a very light trailer which can be handled by a single person while being adapted for carrying heavy loads, and allowing the detachable container or skip to be tipped even when the trailer is not hitched to a towing vehicle.

BACKGROUND OF THE INVENTION

Trailers adapted for being hitched to a light towing vehicle are well known and bring a simple solution to the problem of transporting heavy loads, but the skip which constitutes the main part of these trailers is usually fixed, i.e. non-detachable, which makes unloading operations difficult.

This Applicant's French Pat. No. 2,252,231 discloses a skip hoisting system which can be adapted to light vehicles, such as small trucks. This light type of skip, which can be tipped easily, brings an effective solution to the above-mentioned problem, but when it is required to unload fluid materials, such as water or sand, etc . . . , a tubular extension member has to be added to the hoisting post, prior to the handling operations, in order to obtain a suitable slant.

SUMMARY OF THE INVENTION

This invention relates to an improvement of a device for hoisting a container, of the type comprising a support and a platform hinged together, characterized by the following features:

the said support is mounted on a light towable vehicle provided with two wheels on an axle and with a coupling member for being hitched to a light vehicle, and also with a mast or post, the lower end of which is pivotally connected to said support, this mast carrying on its top a return pulley for a cable attached by one end to a fixed point of the platform for raising said platform and by its other end to a cable-pulling means such as a winch, fixed to said platform;

the support comprises two pivots forming an axis for the pivoting of the platform;

the length of the lever arm between the pivoting axis and the platform end which is lowered is longer than the distance from said pivoting axis to the ground, so that this platform end will cooperate for the raising of the platform by resting on the ground.

The device according to this invention is further characterized by the following features:

the platform swivels about an axis running in proximity to a vertical line passing through the center of gravity of the uniformly loaded platform;

the platform end which is lowered to the ground comprises at least one pair of wheels by which it rests rollably on the ground;

the cable runs through a pulley system formed of three pulleys, namely a first pulley carried on the top of the mast, a second pulley fixed to the platform close to the point where the cable is attached to the platform, and a third pulley mounted on the front end of the flat truck which carries the container;

the second pulley is held by two flat parallel arms welded to the platform end which raises and forming therewith an angle from 45° to 60°;

the mast swings freely between said second pulley and the fixation point of the cable to the platform, and also between the two arms holding the second pulley;

the platform carries parallel slides for guiding the container;

the ends of the slides which are lowered comprise a loading and/or unloading ramp having the form of a retractable pair of slides;

each slide comprises a stud for guiding and locking the mobile container, cooperating with the corresponding female locking element mounted on said container;

the locking element is the control member for the retractable ramp;

the platform comprises a further lock for blocking the container.

The invention will now be further described, referring to the appended drawings by way of non-limitative example, in which:

FIG. 3 is a general diagrammatic view of the container-handling device of the invention, in its container-hoisting function;

FIG. 4 is a general diagrammatic view of the device of the invention, as seen from above;

FIG. 5 is a diagrammatic side view showing details of the retractable loading ramp.

DETAILED DISCRIPTION OF THE INVENTION

Figure 1:
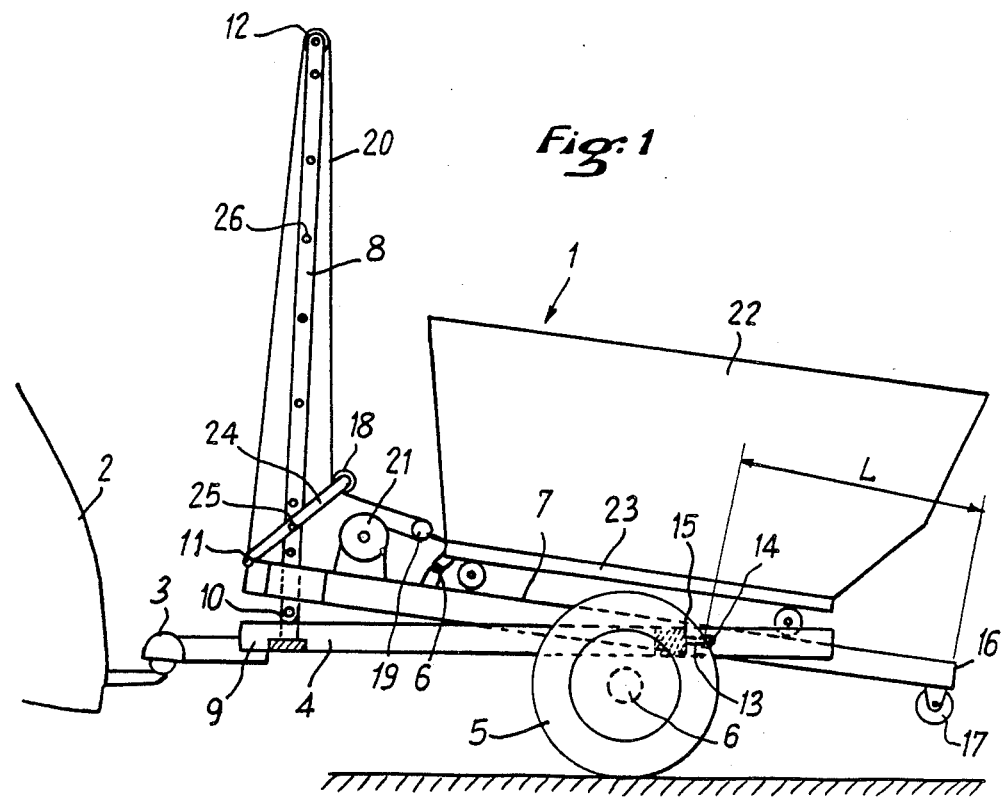
FIG. 1 is a general diagrammatic view of a container-handling device according to the invention.
Figure 2:
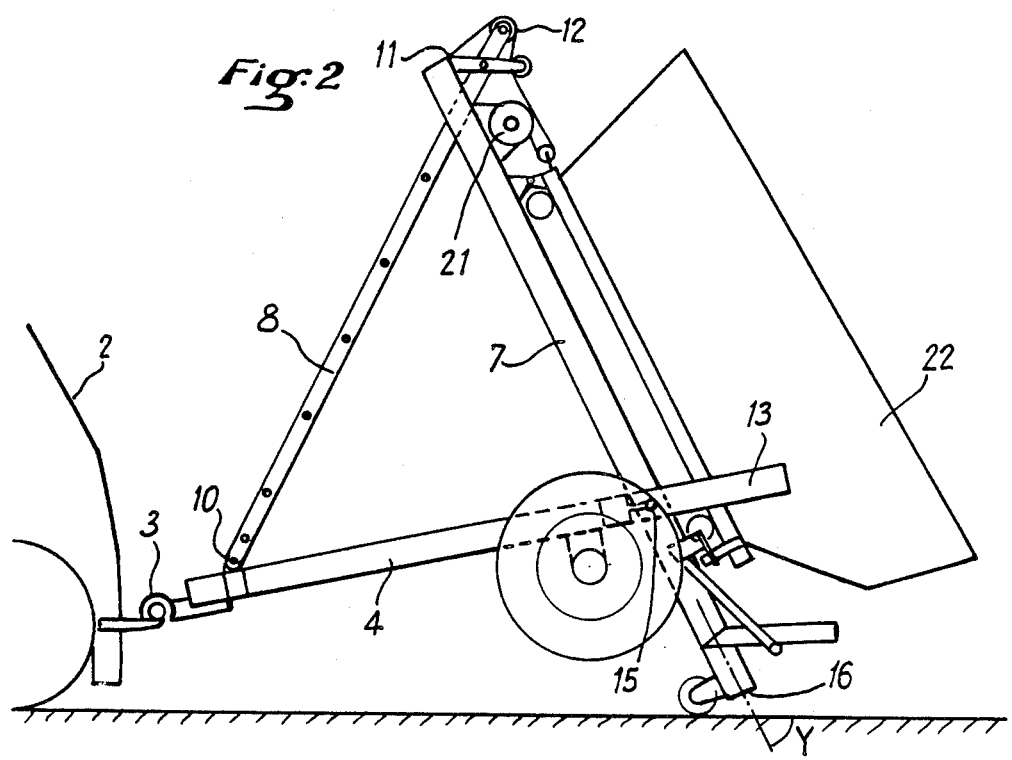
FIG. 2 is a general diagrammatic view of a container-handling device in its tipping function.

FIGS. 1 and 2 show a preferred embodiment of the device according to this invention. They show the device in various positions for raising and lowering the detachable skip.

The device of the invention comprises a trailer 1 which can be linked to a light towing vehicle 2 by means of a coupling link 3. The trailer comprises a support 4 having the shape of a frame mounted on two wheels 5 connected together by an axle 6. The trailer further comprises a platform 7 pivotally mounted on the support 4 and a mast or post 8 for raising the platform, this mast being attached to the front end 9 of the frame 4 and pivotally linked to said frame by its lower end 10, while it can slide through the raising part of the platform, that is the front part 11 of the platform. Holes 26 are drilled along the length of the mast.

A cable 20 attached to the raising end 11 of the platform 7 passes over a return pulley 12 at the top of the mast and is wound on a winch 21 fixed to the platform so as to raise or lower said end 11 of the platform, and hence the platform itself.

In prior known devices, the platform swivels about its rear ends, and the maximum raising angle is proportional to the length of the mast. One of the essential aims of this invention is to obtain the largest possible swivelling angle while keeping down the length of the mast for a platform and support having at least the same dimensions as the prior known device.

An important feature of the invention is the ability of the platform to swivel about a pivoting axis 15 located at the rear end of the support frame.

The length L between the pivoting axis 15 and the end 16 of the platform which will be lowered is longer than the distance from axis 15 to the ground, so that said end 16 will touch the ground when it swivels downwards. Thus, after a first swivelling about the support, the platform will contact the ground.

The rear end 16 of the platform comprises at least one pair of castors 17 or runners through which it will rest on the ground.

When further raising the platform 7, this will rotate about the point where it is resting on the ground, that is, according to the preferred embodiment of the invention, it will rotate about the castors 17.

This rotating motion of platform 7 about the castors 17 is accompanied by a rolling of said castors 17 and by a raising of the pivoting axis 15 and hence of the support 4 and therefore of the wheels 5.

The invention does thus essentially reside in the fact that the platform is not hinged at its rear end, but rather in the vicinity of its middle-length. The reduction of the length of the lever arm formed by the part of the platform which is raised makes it possible to reduce the length of the mast length while retaining the same maximum tipping angle.

The drawings show the platform carrying a container 22 having the shape of a skip which is mounted on a rolling or sliding flat bed 23. In order to decrease the force needed for raising the loaded container, particularly in the beginning phase of raising, as this force bears upon the end 11 of the lever arm formed by the front end of the platform, it is a preferred feature of the invention that the swivelling axis 15 should be placed as close as possible to a vertical line passing through the center of gravity, albeit slightly behind, and behind the axle 6 for ensuring stability of the assembly at rest or during transport.

During the swivelling motion, the gravity center comes closer to the swivelling axis and the force needed for raising the container decreases gradually until the small wheels 17 contact the ground.

In order to reduce the power required from the winch 21, the hoisting cable 20 passes over a pulley block comprised of three pulleys: a first pulley 12 is mounted at the top of the mast, a second pulley 18 is fixed to the platform near point 11 where the cable 20 is attached to said platform so that the two cable strands form an acute angle over pulley 12 on either side of the mast. A third pulley 19 is mounted on the front end of the flat bed 23 supporting the container 22.

This arrangement of the cable allows the winch to perform the tipping function or the traction function without requiring said cable to be manipulated.

Preferably, the second pulley 18 is mounted between two parallel-flat arms 24 fixed to the front end 11 of the platform, forming with said platform an angle comprised between 45° and 60°. These arms form a guide member inside which the mast is allowed to oscillate freely between pulley 18 and the fixation point 11.

Being thus mounted, the mast will work solely under a compression strain between pulley 12 and the swivelling point 10.

The arms 24 are pierced with a hole 25 corresponding to the holes 26 in the mast. When holes 26 and 25 are in axial registry, cotter pin or the like can be inserted for locking the platform to the mast in a set position.

FIG. 4 shows a diagrammatic view of the device of the invention, seen from above.

In a preferred embodiment, the support 4 has the general shape of an isoceles triangle. It is formed of two metal shapes 30a, 30b converging lengthwise at their front ends 31a, 31b where they join a front piece 9, while a cross-member 32 is welded to them in the vicinity of the axle. Two pivots 14a and 14b aligned with each other so as to form together the axis 15 are attached to the cross-member 32 through arms 13a, 13b so that the swivelling of the platform about these pivots will take place in the vicinity of the cross member 32.

The support 4 further comprises a shaped reinforcing member 34 on which the mast 8 is pivotally mounted, while on another hand the platform 7 comes to rest on this member 34.

The platform 7 is formed of two shapes 40a and 40b converging longitudinally by their front ends 41a and 41b, while the rear ends 16a and 16b of these shapes run parallel to each other. The front ends 41a and 41b are welded to a junction piece 11 forming the front end of the platform. The spacing of shapes 40a and 40b is narrower than the spacing of shapes 30a and 30b of the support, so that the front end piece 11 of the platform is inserted between the shapes 30a and 30b of the support and will rest upon the front reinforcing member 34 while the rear end of the platform will rest upon the rear cross-member 32 of the support. The shapes 40a and 40b are provided in their parallel sections with sockets for receiving the pivots 14 of the platform.

On this platform 7 may be placed any fixed or removable type of support. In a preferred embodiment, there are provided on the platform two rail-shaped parallel slides 50a and 50b, the rear ends of which 52a and 52b correspond to the rear ends 16a, 16b of the platform. These slides are designed for receiving all sorts of containers 22 being mounted on wheels.

According to a further feature of the invention, each rail 50 is advantageously provided with a stud 57 for guiding and locking the mobile container. This stud is fixed to the rail and extends towards the rear end of the platform, parallel thereto. This stud cooperates with a corresponding female locking member 58 attached to the container, preferably on its rear end, for preventing the container to slide out of the rails after it has been placed thereon.

FIG. 5 shows a further feature of the invention in which there are provided, on the rear ends 52a, 52b of the slides, retractable ramps 53 for loading a container onto the platform and for unloading it. These ramps have the same configuration as the slides 50a, 50b. They are attached to the slide by a pivot 55 and each of them is actuated by a rod 54 which can move lengthwise in a slide 56 fixed alongside said rail 50 so that a motion of this rod 54 will cause the ramp to move upwards or downwards. This longitudinal motion of rod 54 in its slide 56 is actuated in known manner by the motion of the container. However, in a preferred embodiment of the invention, the locking element 58 is placed so as to be operative for actuating the motion of rod 54.

Preferably, the platform is provided on its front end with a locking member 60 of a known type for retaining the flat bed 23 which supports the container.

Operation of the device of the invention is as follows:

The support 4 is coupled to the rear of vehicle 2. The container 22 is installed on platform 7 which is lowered onto the frames 32, 34 of support 4.

The hoisting of the skip takes place as follows: the winch 21 is actuated, either manually or by an electric motor. Cable 20, passing over pulleys 12, 18, 19, winds on the winch and exerts an upwards traction force on the front end 11 of the platform. Taking into account the effect of the pulley-block system, the traction force exerted by the winch is approximately half of the compression stress exerted on the mat.

As a result of the cable being wound up, the distance between platform end 11 and the top of mast 8 decreases. The platform being hinged to the support 4 is raised as it swivels gradually, and the container follows this same motion.

When the castors 17 contact the ground, the container has not yet reached its maximum inclination. As the winch further winds the cable, the platform rises further as it swivels about the castors 17. Simultaneously, it will be seen that the wheels 5 of the support rise above the ground while the castors 17 roll inwards, and the skip is tipped.

The effort to be provided by the winch is small, since the vertical line through the gravity center is at first in close vicinity to the tipping axis 14, and in a second phase it is close to the pivoting axis formed by the castors 17.

On another hand, the mast being pivotally linked to the support will gradually oscillate freely about axis 10, so that it remains perpendicular to the platform. It will thus be solely subjected to a compression strain, which is moderate, so that the mast may be of a light construction.

Meanwhile, the raising motion may be interrupted and the platform may be immobilized by being locked by means of a pin inserted through the holes 25 and 26.

When the platform is raised approximately half-way and has been locked in this position, the container may then be displaced.

Lock 60 is released and the winch is actuated in reverse. The cable unwinds and the container begins to slide down along rails 50a, 50b. The locking members 58 actuate the lowering of the ramps 53 and the container may then roll down to the ground. When the container is fully lowered down, the pulley 19 may be unhooked and another container may be loaded onto the platform. For hoisting up this new container, the winch will be actuated in the forward (winding) direction. The ramps 53 will be automatically retracted upwards, being actuated by the locking members 58. The container is locked in place by members 57 and 58 and further immobilized by lock 60.

This improvement to existing devices brings about many advantages, since it makes it possible, among other features, to build a very light trailer which can be handled by a single person while it is capable of carrying heavy loads. It can be pointed out that with trucks of heavier types the ratio of the empty weight to the full weight under load is to the order of 1 to 2, while the device of the invention may provide such a ratio of approximately 1 to 10.

Since the load is kept closer to the center of the trailer, the mast and the winch are subjected to less efforts. For instance, for a load of 1 tonne, the effort on the winch will be approximately 150 kg, so that the mast can be very light and the winch will need only a small power and will thus be of a small cost. On another hand, the wrenching stresses on the ball-and-socket coupling member 3 are eliminated, and the support frame 4 is horizontally stable without requiring props at the rear.

Also, since the front end of the support is only subjected to a lowering stress, the tipping operation can be effected without the trailer having to be attached to a vehicle, and the load will remain stable in every case.

A further feature is that the platform can receive any type of container, ranging from the pallet carrier to the building site hut, including all sorts of skips or items of heavy equipment. The device makes it possible to use several containers, for instance to exchange an empty container for a full one, and thus the handling costs will be decreased.

Finally, the small volume of the device, in combination with the above-mentioned advantageous features, makes it possible to use it in narrow alleys which cannot be entered by conventional trucks.

I claim:

1. A device for handling a container, comprising
    a supporting frame pivotally attached to a mobile platform, said supporting frame having at least two wheels, a mast having a lower end thereof pivotally attached to the supporting frame, the mast having at least a first pulley on a top end thereof, said pulley receiving a cable for raising said mobile platform having one end attached to a fixed point, another end of the cable is attached to cable pulling means attached to the mobile platform, the supporting frame comprises at least two pivots forming an axis for pivoting the platform;
    a lever arm having the length of a portion thereof between the pivoting axis and a lowered end of the platform longer than the distance from the pivoting axis to the ground, wherein a lowered end of the platform can rest on the ground when the platform is raised;
    said lowered end of the platform having at least two small wheels capable of resting on the ground,
    whereby a pulley system receiving the cable comprises said first pulley, a second pulley rotatably attached to the platform near a point of attachment of the cable to the platform and a third pulley rotatably attached to a front end of a base carrying the container.

2. A device according to claim 1 wherein the platform swivels about an axis situated near a vertical line passing through a center of gravity of the uniformly loaded platform.

3. A device according to claim 1 wherein the second pulley is held between two substantially parallel flat arms fixedly attached to the end of the platform raised during the operation and forming an angle therewith between 45° and 60°.

4. A device according to claim 3, wherein the mast is allowed to oscillate freely between the second pulley and the fixation point of the cable and between said two arms holding said second pulley.

5. A device according to claim 2, wherein the platform carries parallel slides for guiding the container.

6. A device according to claim 5 wherein ends of the slides have a shape allowing the container to be hoisted onto the platform and released to the ground.

7. A device according to claim 5, wherein each said slide is provided with a stud for guiding and locking the container, said stud cooperates with a corresponding female locking member mounted on said container.

8. A device according to claim 7, wherein the locking member is a control member for a retractable ramp.

9. A device according to claim 8, wherein the mobile platform comprises a locking member for locking the container to the platform.

* * * * *